Dec. 27, 1960 N. E. ALEXANDER 2,966,234
MEMBRANE FILTER HOLDER
Filed May 13, 1959

INVENTOR
Nelson E. Alexande

BY *George Renehan*

ATTORNEY 2,966,234

MEMBRANE FILTER HOLDER

Nelson E. Alexander, Frederick, Md., assignor to the United States of America as represented by the Secretary of the Army Filed May 13, 1959, Ser. No. 813,042

1 Claim. (Cl. 183—44)

(Granted under Title 35, U.S. Code (1952), sec. 266)

The invention described herein may be manufactured and used by or for the Government of the United States of America for governmental purposes without the payment to me of any royalty thereon.

This invention relates to a filter holder for supporting a filtering medium such as a membrane filter while sampling an aerosol or other gaseous medium.

Many types of filter holders have been designed for supporting membrane filters. In such holders, several features are essential. First there must be absolute gas tightness so that no air or particulate matter can bypass the filter. Secondly, the filter element must be uniformly supported over its entire surface against the pressure differential across the filter. Finally, the holder must be easily assembled and disassembled without damaging the filter element and it must be economical to produce.

Figure 1:
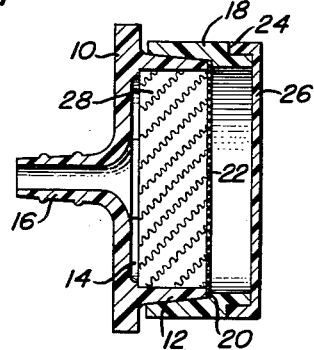
Figure 2:
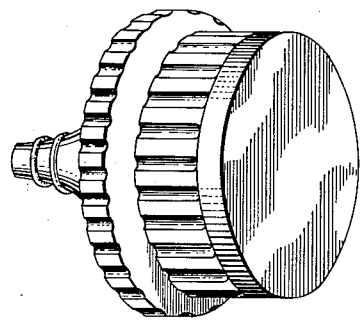

All of these qualities are incorporated in the holder herein shown where Fig. 1 shows a cross section on a diameter of the filter and Fig. 2 shows a perspective view of the assembled holder.

In the drawing, 10 is the holder base formed of a rigid plastic material such as polystyrene, having a tapered flange 12 and a recess 14 on one side and an axial tapered nozzle 16 on the other side. A tapered cylinder 18 made of polyethylene or other flexible or stretchable material is press fitted over the base taper 12. A flange 20 on the inside of cylinder 18 engages the end of flange 12 and forms a circumferential clamp for membrane filter 22. Another flange 24 on the outside circumference cylinder 18 serves to receive cover 26 which completes the exterior structure. Central support for the membrane filter is provided by a roll of creped paper 28.

In assembling the filter the roll of crepe is reinforced by application of some plastic to the back usually in the form of a cross or other suitable configuration. Support may also be provided by placing the plastic between the layers as the paper is rolled up. Both of these methods serve the purpose of reinforcing the paper support to prevent collapse under suction. This creped paper cylindrical support roll is of such height as to bring its surface flush with the edge of flange 12. The membrane filter 22 cut to the proper size is then placed over the base and cylinder 18 is pressed down over the filter. Due to the flexibility of cylinder 18, the latter is made slightly smaller than flange 12, thereby making it a tight fit and holding membrane 22 tightly and uniformly in compression around flange 20. This feature is very important in the structure of the filter holder.

Membrane filters are quite fragile and when a screw type compression attachment is used, it often results in tearing of the filter. In the present construction this possibility is completely avoided by a convenient press fit. Removal is equally simple as the two flanges can be easily pulled apart in a reverse manner to that of the assembly.

The presence of the rolled crepe paper offers almost a continuous support to the filter element and permits a high suction to be applied without damage to the filter.

In using the filter, the holder is loaded and a cover 26 is placed over the filter. This maintains the sterility of the filter and when an aerosol sample is desired it is only necessary to attach nozzle 16 to a source of vacuum and remove cover 26 for the duration desired.

This filter holder is simple in structure and inexpensive to produce yet it permits of excellent results and has many points of superiority over metal, screw compression type holders.

I claim:

A filter assembly comprising a perforated circular base terminating in an axial exhaust nozzle on one side of said base, a surrounding circular tapered axially projecting flange on the other side of said base, a tapered elastic cylindrical retaining ring having an internal flange at the inner end of said taper, said tapered retaining ring being tightly fitted over said first tapered flange and holding a membrane filter in compression between the top of said first tapered flange and the inner flange on said retaining ring, a support for said membrane filter comprising an edgewise round roll of crepe paper positioned under said membrane and with its upper surface in the plane of the top of said tapered flange.

References Cited in the file of this patent

UNITED STATES PATENTS

| | | |
|---|---|---|
| 1,020,782 | Tinker | Mar. 19, 1912 |
| 1,398,685 | Gordon | Nov. 29, 1921 |
| 1,753,809 | Short | Apr. 8, 1930 |
| 2,482,330 | Dudzinski | Sept. 20, 1949 |
| 2,577,606 | Conley | Dec. 4, 1951 |
| 2,728,407 | Squier | Dec. 27, 1955 |
| 2,835,341 | Parker | May 20, 1958 |